United States Patent
Hatakeyama

(10) Patent No.: US 9,041,833 B2
(45) Date of Patent: May 26, 2015

(54) IMAGE PROCESSING METHOD, IMAGE PROCESSING APPARATUS, AND IMAGE PICKUP APPARATUS

(75) Inventor: Koshi Hatakeyama, Tokyo (JP)

(73) Assignee: CANON KABUSHIKI KAISHA (JP)

( * ) Notice: Subject to any disclaimer, the term of this patent is extended or adjusted under 35 U.S.C. 154(b) by 651 days.

(21) Appl. No.: 13/119,859

(22) PCT Filed: Sep. 28, 2009

(86) PCT No.: PCT/JP2009/004952
§ 371 (c)(1),
(2), (4) Date: Mar. 18, 2011

(87) PCT Pub. No.: WO2010/038411
PCT Pub. Date: Apr. 8, 2010

(65) Prior Publication Data
US 2011/0193997 A1      Aug. 11, 2011

(30) Foreign Application Priority Data

Sep. 30, 2008    (JP) ................. 2008-252325

(51) Int. Cl.
*H04N 5/357*    (2011.01)
*G06T 5/00*     (2006.01)

(52) U.S. Cl.
CPC .... *H04N 5/3572* (2013.01); *G06T 2207/20201* (2013.01); *G06T 5/003* (2013.01); *G06T 5/006* (2013.01); *G06T 2207/10024* (2013.01)

(58) Field of Classification Search
CPC ....... H04N 5/3572; G06T 5/003; G06T 5/006
USPC ............. 348/335, 251, 222.1, 207.99, 223.1, 348/224.1, 229.1, 230.1, 234, 241, 254, 348/255; 359/16; 382/254, 260, 273, 276, 382/280, 255, 263, 264, 266, 275
See application file for complete search history.

(56) References Cited

U.S. PATENT DOCUMENTS 8,106,976 B2 * 1/2012 Kawasaka ................ 348/251
2006/0017813 A1 * 1/2006 Okubo et al. ............ 348/208.2
(Continued)

FOREIGN PATENT DOCUMENTS

EP     1708136 A1    10/2006
JP     64-074679 A    3/1989
(Continued)

OTHER PUBLICATIONS

Notification of Transmittal of International Search Report and the Written Opinion issued in related PCT/JP2009/004952 mailed Jan. 12, 2010.
(Continued)

*Primary Examiner* — Twyler Haskins
*Assistant Examiner* — Peter Chon
(74) *Attorney, Agent, or Firm* — Rossi, Kimms & McDowell LLP

(57) ABSTRACT

The image processing method processes an image generated by image pickup using an optical system (100). The method includes a step of acquiring the image, an image restoration step (S2-S7) of performing image restoration processing to reduce a blur component of the image using an image restoration filter, and a distortion correction step (S8) of performing geometric transformation processing to reduce a distortion component of the image on which the image restoration processing has been performed.

8 Claims, 8 Drawing Sheets

(56) References Cited

U.S. PATENT DOCUMENTS

| | | | |
|---|---|---|---|
| 2006/0239549 A1* | 10/2006 | Kelly et al. | 382/167 |
| 2007/0126892 A1* | 6/2007 | Guan | 348/240.99 |
| 2007/0146689 A1* | 6/2007 | Araki et al. | 356/124.5 |
| 2008/0137980 A1 | 6/2008 | Mizuno | |
| 2009/0219419 A1* | 9/2009 | Kawasaka | 348/251 |

FOREIGN PATENT DOCUMENTS

| | | |
|---|---|---|
| JP | 2002-024816 A | 1/2002 |
| JP | 2006-270918 A | 10/2006 |
| JP | 2008146155 A | 6/2008 |
| WO | 99/67743 A1 | 12/1999 |
| WO | 2005/069216 A1 | 7/2005 |

OTHER PUBLICATIONS

European Search Report issued in European counterpart application No. EP09817454.3, dated May 26, 2014.

John Loomis: "2D Convolution", Feb. 14, 2001, pp. 1-5, XP055117763, Retrieved on May 13, 2014. <<http://www.johnloomis.org/ece563/notes/filter/conv/convolution>> Cited in EPSR issued in counterpart appln. No. EP09817454.3, dated May 26, 2014.

* cited by examiner

IMAGE PROCESSING METHOD, IMAGE PROCESSING APPARATUS, AND IMAGE PICKUP APPARATUS

This application is a U.S. National Phase Application of PCT International Application PCT/JP2009/004952 filed of Sep. 28, 2009, which is based on and claims priority from Japanese Patent Application No. 2008-252325 filed on Sep. 30, 2008, the contents of which is incorporated herein by reference in its entirety.

TECHNICAL FIELD

The present invention relates to an image processing technology for reducing an image blur component and a distortion component contained in an image.

BACKGROUND ART

An image acquired by capturing an image of an object through an image pickup apparatus such as a digital camera contains an image blur component which is an image deterioration component caused by spherical aberration, comatic aberration, field curvature, astigmatism or the like of an image taking optical system (hereinafter simply referred to as "optical system"). Such an image blur component is generated because a light flux emitted from one point of the object forms an image with some divergence on an image pickup surface, the light flux being normally converged at one point when there is no aberration or diffraction.

Such an image blur component is optically represented by a point spread function (PSF), and different from a blur caused by defocusing. Color blur in a color image caused by longitudinal chromatic aberration, chromatic spherical aberration, or chromatic comatic aberration of the optical system can be said to be a difference between blurring degrees of respective wavelengths of light.

As a method for correcting an image blur component, there is known a correction method which uses information of an optical transfer function (OTF) of an optical system. This method is referred to as "image restoration". Hereinafter, processing for correcting (reducing) an image blur component by using the information of the optical transfer function (OTF) of the optical system is referred to as "image restoration processing".

The outline of the image restoration processing is as follows.

When g(x, y) represents a deteriorated image (input image) containing an image blur component, f(x, y) represents an original non-deteriorated image, h(x, y) represents a point spread function (PSF) which is a Fourier pair of an optical transfer function, * represents convolution, and (x, y) represents coordinates on an image, the following expression is established:

$$g(x, y) = h(x, y) * f(x, y).$$

When converting the above expression into a form of a two-dimensional frequency surface through Fourier transformation, the expression is presented as follows, which takes a form of a product for each frequency:

$$G(u, v) = H(u, v) \cdot F(u, v)$$

where H indicates a result of Fourier transformation of the point spread function (PSF), in other words, an optical transfer function (OTF), and (u, v) indicates coordinates on the two-dimensional frequency surface, in other words, a frequency.

In order to acquire the original image from the deteriorated image, both sides of the expression only need to be divided by H as below:

$$G(u, v)/H(u, v) = F(u, v).$$

Returning the F(u, v) through inverse Fourier transformation to a real surface enables acquisition of a restored image equivalent to the original image f(x, y).

When R represents a result of inverse Fourier transformation of $H^{-1}$, performing convolution processing for an image in the real surface as represented by the following expression similarly enables acquisition of the original image:

$$g(x, y) * R(x, y) = f(x, y).$$

R(x, y) in the expression is referred to as "image restoration filter". A real image contains a noise component, and hence use of an image restoration filter created by taking a completely inverse number of the optical transfer function (OTF) as described above results in amplification of the noise component together with the deteriorated image. Therefore, generally, a good image cannot be acquired. In this regard, there is known a method such as use of a Wiener filter for suppressing a high frequency side restoration rate of an image according to an intensity ratio of an image signal to a noise signal. Deterioration of the image due to the color blur component is substantially corrected by, for example, causing blur amounts of respective color components to be uniform by the image blur component correction.

The optical transfer function (OTF) fluctuates according to conditions of the optical system such as a focal length (zoom state) and an aperture diameter, and hence the image restoration filter used for the image restoration processing needs to be changed.

Further, an image may contain a distortion component. The distortion is generally geometric distortion in which expansion or contraction of a peripheral part of the image is greater and which is caused by distortion aberration of an optical system.

Japanese Patent Laid-Open No. 2006-270918 discloses a method for correcting geometric distortion of an image caused by distortion aberration. The method corrects the geometric distortion by obtaining information on image pickup conditions such as a zoom state and an object distance in image pickup, and using data corresponding to the obtained image pickup condition information read from distortion aberration data prepared beforehand. The distortion aberration data is a function based on an image height. In distortion component correction, a large distortion amount of an optical system needs a large geometric transformation amount, and especially in a peripheral part of the image, scaling and transformation are performed as the geometric transformation.

In order to obtain a high-quality image by properly correcting an image deteriorated by various aberrations of the optical system, processing for reducing the image blur component and the distortion component needs to be performed.

Moreover, data of the image restoration filter used for correcting the image blur component and data of a geometric transformation condition used for correcting the distortion component need to be changed according to the image pickup conditions. The image pickup conditions include many parameters such as a zoom position, an aperture diameter and an object distance, and preparing the image restoration filter data and the geometric transformation condition data according to combinations of such many parameters significantly increases a data volume. In particular, since the image restoration filter is two-dimensional filter, the number of cells (taps) of the filter increases as the image blur component increases.

The inventor found the following problem relating to the number of cells of the image restoration filter in the correction of the distortion component with the correction of the image blur component. The distortion component correction on a deteriorated image geometrically performs scaling and transformation of the image according to an image height. On the other hand, the optical transfer function (OTF) for designing the image restoration filter can be derived from designed values or measured values of the optical system. However, in any case, the optical transfer function is derived from the optical system containing the distortion aberration.

Therefore, to perform the image restoration processing on the image on which the distortion correction processing has been performed, it is necessary to perform on the image restoration filter the scaling and the transformation according to the geometric transformation condition which has been used in the distortion correction processing. When the optical system has negative distortion, scaling, transformation and pixel interpolation are performed on the image in the distortion correction processing, so that scaling, transformation and cell interpolation are also performed therewith on the image restoration filter. As a result, the number of cells of the image restoration filter is increased, which increases the data volume of the image restoration filter. In addition, a calculation amount of filtering is also increased, which remarkably decreases a processing speed.

In a method for correcting the distortion component disclosed in Japanese Patent Laid-Open No. 2006-270918, geometric transformation correction is performed using aberration information corresponding to the image pickup condition. However, this method cannot correct the image blur component other than the distortion component, so that a high quality image cannot be obtained.

SUMMARY OF INVENTION

The present invention provides an image processing method, an image processing apparatus and an image pickup apparatus each of which is capable well correcting the image blur component and the distortion component in an image while suppressing decrease of the processing speed due to the increase of the data volume of the image restoration filter.

The present invention provides as an aspect thereof an image processing method for processing an image generated by image pickup using an optical system. The method includes a step of acquiring the image, an image restoration step of performing image restoration processing to reduce a blur component of the image using an image restoration filter, and a distortion correction step of performing geometric transformation processing to reduce a distortion component of the image on which the image restoration processing has been performed.

The present invention provides as another aspect thereof an image processing apparatus processing an image generated by image pickup using an optical system. The apparatus includes an image restoring part configured to perform image restoration processing to reduce a blur component of the image using an image restoration filter, and a distortion correcting part configured to perform geometric transformation processing to reduce a distortion component of the image on which the image restoration processing has been performed.

The present invention provides as still another aspect thereof an image pickup apparatus including an image pickup system configured to photoelectrically convert an object image formed by an optical system to generate an image, and the above-described image processing apparatus.

Other aspects of the present invention will become apparent from the following description and the attached drawings.

DESCRIPTION OF EMBODIMENTS

Exemplary embodiments of the present invention will hereinafter be described with reference to the accompanying drawings.

[Embodiment 1]

Figure 1:
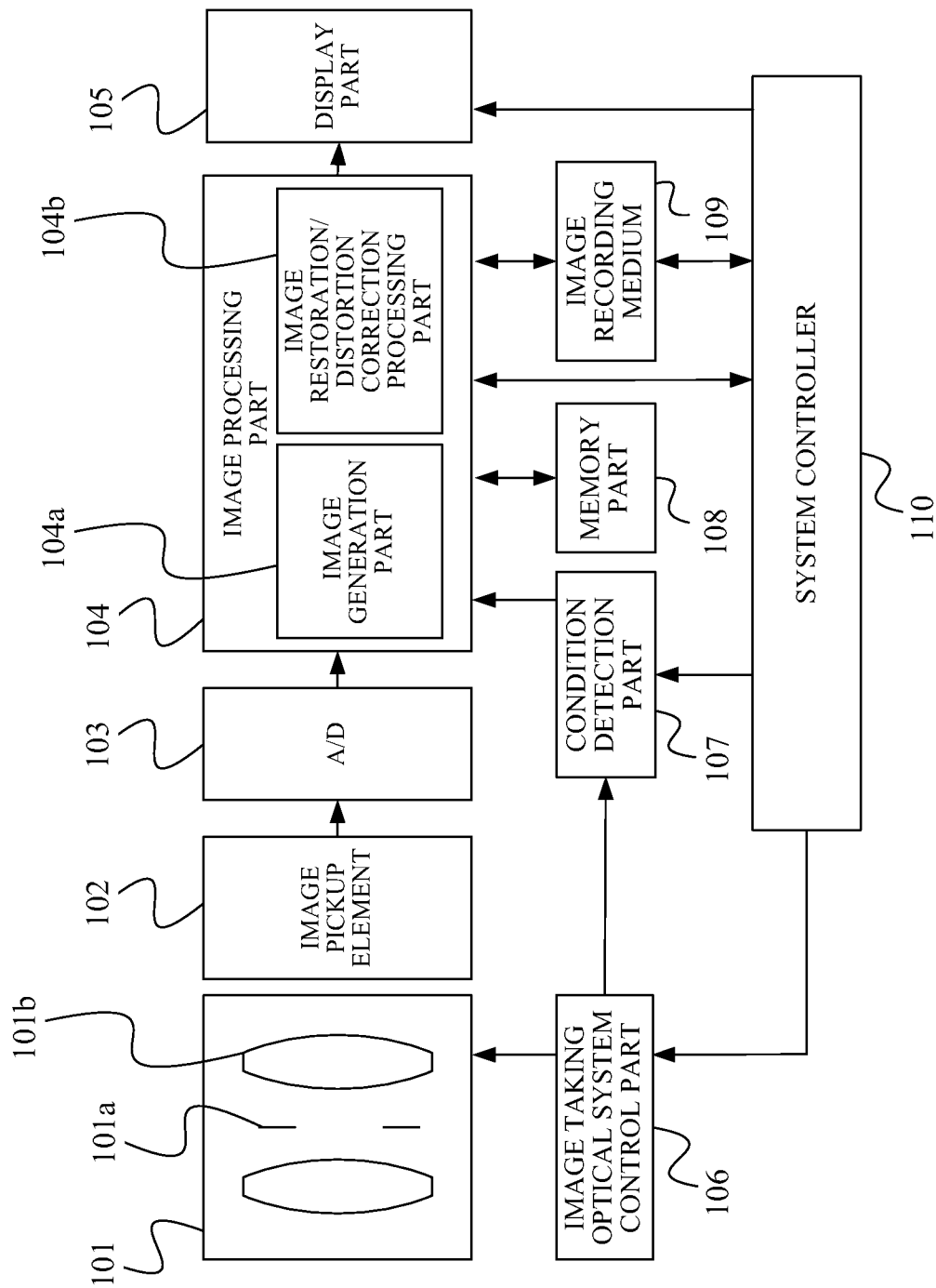
FIG. 1 is a block diagram showing a configuration of an image pickup apparatus which is Embodiment 1 of the present invention.

FIG. 1 shows a configuration of an image pickup apparatus such as a digital still camera or a video camera including an image processing apparatus, in other words, using an image processing method, which is a first embodiment (Embodiment 1) of the present invention. This embodiment will describe an image pickup apparatus which reduces (corrects) an image blur component and a color blur component in a captured image by image restoration processing, and reduces (corrects) a distortion component and a color shear component by geometric transformation processing as distortion correction processing. The color shear component is generated due to chromatic aberration of magnification of an optical system, the chromatic aberration of magnification being a difference of image pickup magnifications for color components of R, G and B.

The image blur component mentioned in this embodiment is a blur component as an image deterioration component caused due to spherical aberration, comatic aberration, field curvature, astigmatism and the like. The image restoration processing (image restoring part) only has to reduce such an image deterioration component caused due to these aberrations to some degree. For example, the image restoring part may reduce an image deterioration component based on at least one of aberrations such as the spherical aberration, the comatic aberration, the field curvature and astigmatism.

In FIG. 1, a light flux from an object (not shown) passes through an image taking optical system 101 to form an object image on an image pickup element 102 constituted by a CCD sensor, a CMOS sensor or the like.

The image taking optical system 101 includes a magnification varying lens (not shown), an aperture stop 101a, and a focus lens 101b. Moving the magnification varying lens in an optical axis direction enables zooming for changing a focal length of the image taking optical system 101. The aperture stop 101a adjusts an amount of light reaching the image pickup element 102 by increasing/decreasing its aperture diameter. Focusing according to an object distance is performed by controlling a position of the focus lens 101b in the optical axis direction by an auto-focus (AF) mechanism or a manual focus mechanism (not shown).

The object image formed on the image pickup element 102 is converted into an electric signal by the image pickup element 102. An analog output signal from the image pickup element 102 is converted into a digital image pickup signal by an A/D converter 103 to be input to an image processing part 104.

The image processing part 104 includes an image generation part 104a which performs various processing on the input digital image pickup signal to generate a color input image. The image processing part 104 includes an image restoration/distortion correction processing part 104b which corresponds to an image restoring part and a distortion correcting part and which performs image restoration processing and geometric transformation processing (distortion correction processing) on the input image. A system from the image pickup element 102 to the image generation part 104a constitutes an image pickup system.

The image restoration/distortion correction processing part 104b acquires information on a condition of the image taking optical system 101 (the condition is hereinafter referred to as "image pickup condition") from a condition detection part 107. The image pickup condition includes, for example, the focal length (zoom position) of the image taking optical system 101, the aperture diameter (aperture value or F-number) of the aperture stop 101a and a focus lens position (object distance). The condition detection part 107 may acquire the information on the image pickup condition from a system controller 110 or an image taking optical system control part 106 for controlling the image taking optical system 101.

The image restoration/distortion correction processing part 104b selects an image restoration filter from a memory part 108 corresponding to the image pickup condition to perform the image restoration processing on the input image. The image restoration/distortion correction processing part 104b selects a geometric transformation condition corresponding to the image pickup condition from the memory part 108, and then processes the geometric transformation processing on the image on which the image restoration processing has been performed. The condition detection part 107, the image restoration/distortion correction processing part 104b and the memory part 108 constitute the image processing apparatus in the image pickup apparatus.

Figure 2:
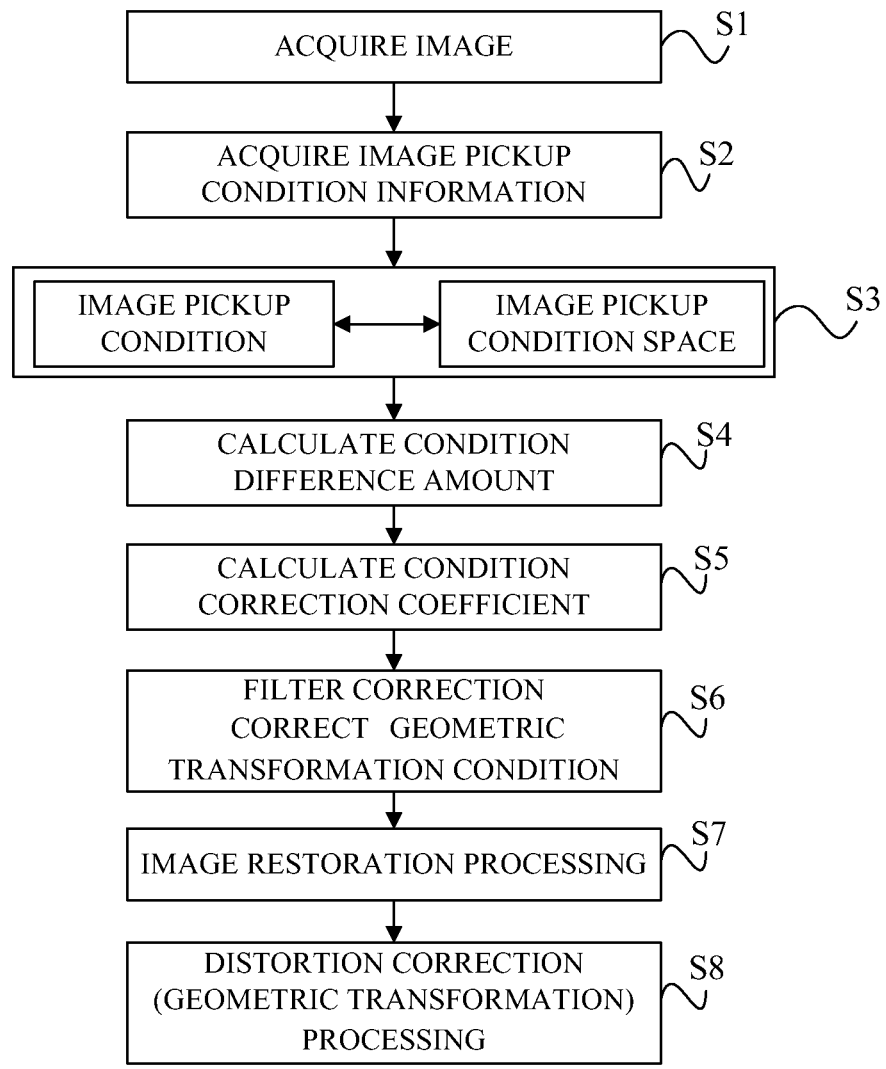
FIG. 2 is a flowchart showing processing performed in the image pickup apparatus of Embodiment 1.

FIG. 2 shows a flowchart of processing (image processing method) relating to image restoration and geometric transformation which are performed by the image restoration/distortion correction processing part 104b. In the following description, the image restoration/distortion correction processing part 104b is referred to as "image processing part 104". The image processing part 104 is constituted by an image processing computer, and performs the processing according to a computer program.

At Step S1, the image processing part 104 acquires, as a target of the image restoration processing, an input image generated based on the output signal from the image pickup element 102.

At Step S2, the image processing part 104 acquires information of the image pickup condition (hereinafter also referred to as "image pickup condition information") from the condition detection part 107. In this embodiment, the image pickup condition includes the zoom position, the aperture diameter and the object distance.

At Step S3, the image processing part 104 selects an image restoration filter corresponding to the image pickup condition acquired at Step S2 among plural image restoration filters stored in the memory part 108.

The memory part 108 stores only image restoration filters corresponding to discretely selected image pickup conditions so as to reduce the number of the image restoration filters (number of data). Thus, if there is stored no image restoration filter in the memory part 108 corresponding to the image pickup condition acquired at Step S2 or to an image pickup condition quite similar to the acquired image pickup condition, the image processing part 104 selects an image restoration filter as similar as possible to the acquired image pickup condition. At subsequent Steps S4 to S6, the image processing part 104 corrects the image restoration filter so as to be optimized to the image pickup condition acquired at Step S2, thereby creating an image restoration filter to be actually used.

Figure 3:
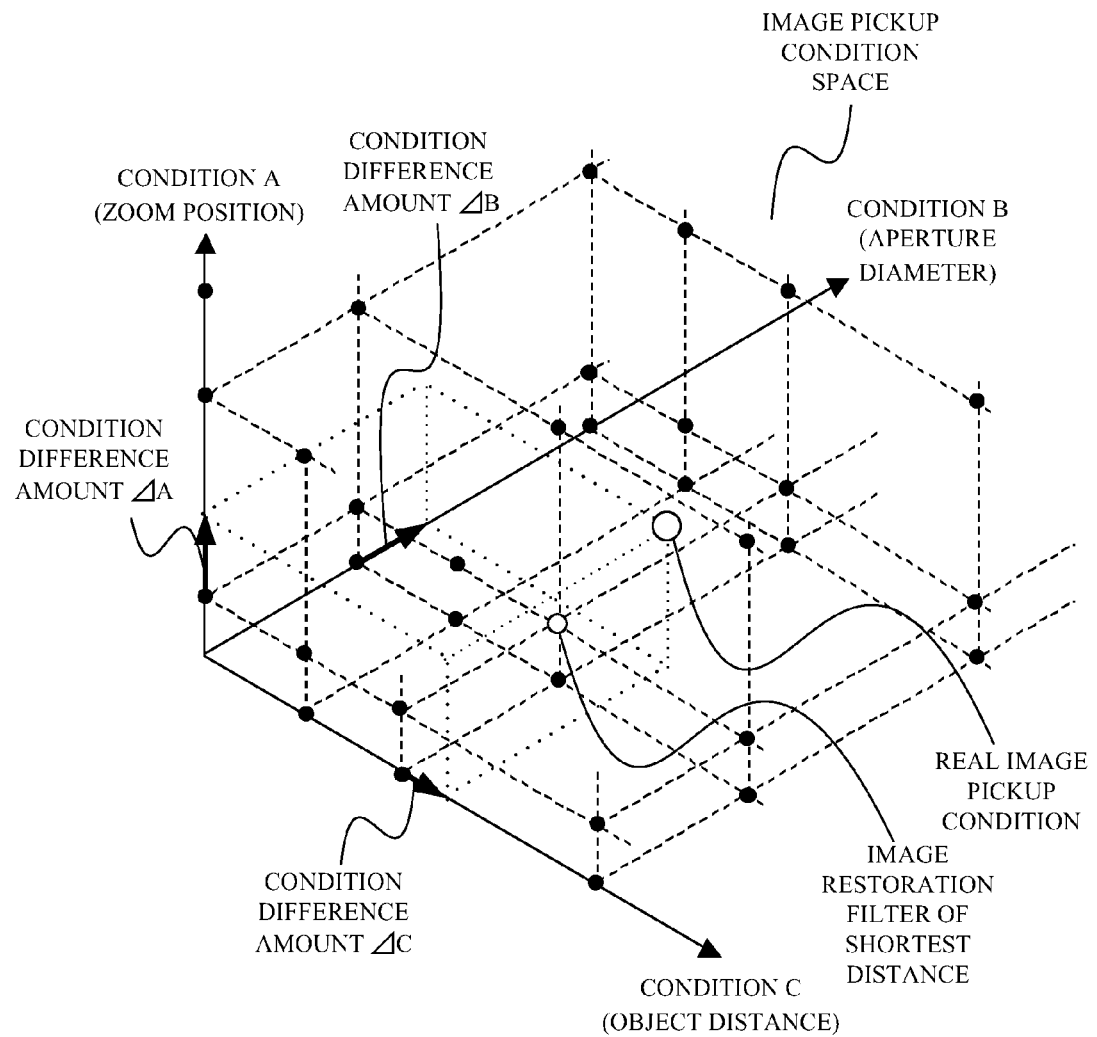
FIG. 3 is a schematic diagram of an image pickup condition space for disposing an image restoration filter stored in a memory part in Embodiment 1.

FIG. 3 schematically shows the image restoration filters stored in the memory part 108 corresponding to the discretely selected image pickup conditions. As described above, the image restoration filters stored in the memory part 108 are discretely arranged in an image pickup condition space having three image pickup condition axes which are an axis of the zoom position (condition A), an axis of the aperture diameter (condition B) and an axis of the object distance (condition C). Coordinates of respective points (shown by black circles) in the image pickup condition space indicate the image restoration filters stored in the memory part 108.

In FIG. 3, the image restoration filters are arranged at lattice points on lines orthogonal to the respective image pickup condition axes. However, the image restoration filter may be arranged off the lattice point. Further, the image pickup condition may include a parameter other than the zoom position, the aperture diameter and the object distance, or the number of the parameters of the image pickup condition is not limited to three. That is, a four or more dimensional image pickup condition space based on four or more parameters of the image pickup condition may be provided to discretely arrange image restoration filters therein.

A method for creating the image restoration filter to be actually used from such discretely arranged image restoration filters will be described below.

Figure 4:
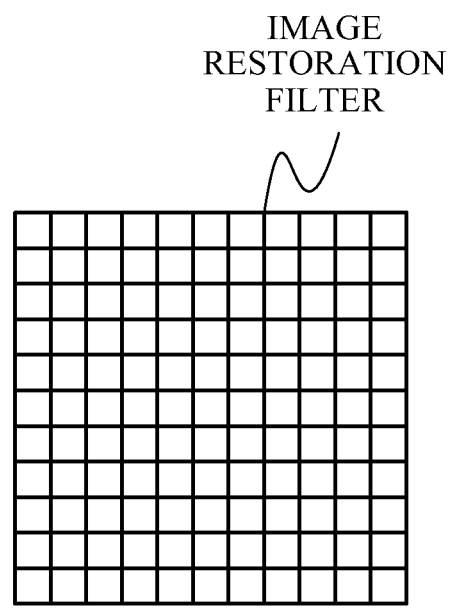
FIG. 4 shows the image restoration filter used in the image pickup apparatus of Embodiment 1.

FIG. 4 shows an example of the image restoration filter. In the image restoration filter, the number of cells (taps) is determined according to an aberration amount of the image taking optical system 101. The image restoration filter shown in FIG. 4 is a two-dimensional filter which has 11×11 cells. Each cell corresponds to one pixel of one image.

Using an image restoration filter which is a two-dimensional filter including more than 100 divided cells enables acquisition of a good image restoration result even when the image taking optical system 101 has aberration widely diverged from an image-forming position, such as spherical aberration, comatic aberration, longitudinal chromatic aberration or off-axis chromatic flare. Further, performing convolution processing on the input image using such a real space image restoration filter enables image restoration without Fourier transformation.

Figure 5:
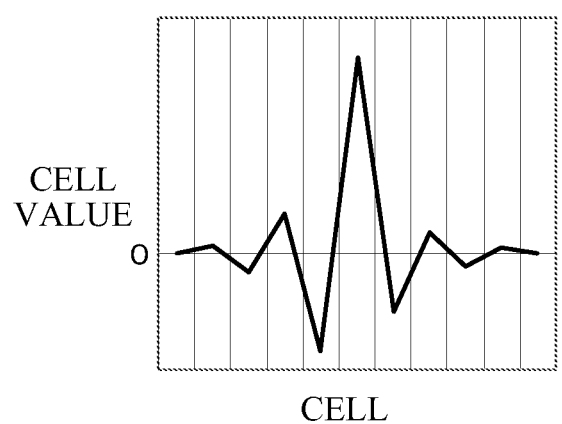
FIG. 5 shows a distribution of cell values of the image restoration filter.

Each cell is set to have a value shown in FIG. 5 based on information on the aberration of the image taking optical system 101 such as the spherical aberration, the comatic aberration, the longitudinal chromatic aberration or the off-axis chromatic flare. FIG. 5 shows cell values (filter values) on one section of the image restoration filter. The image restoration filter is created such that its filter values have a two-dimensional distribution. In the example shown in FIG. 5, the image restoration filter is created so as to restore aberration such as the comatic aberration having asymmetry property at a position shifted from a center of the input image.

The image restoration filter is created by calculating or measuring an optical transfer function (OTF) of the image taking optical system 101, and performing inverse Fourier transformation on an inverse function of the optical transfer function. An influence of noise generally needs to be taken into consideration, and hence methods for creating a Wiener filter or other restoration filters can be selectively used.

The optical transfer function preferably contains not only factors in the image taking optical system 101 but also factors in generation of the input image from the output signal of the image pickup element 102 at the image processing part 104, each factor deteriorating the optical transfer function. In other words, the image restoration filter may be created by performing the inverse Fourier transformation on a function generated based on the inverse function of the optical transfer function of the image taking optical system (or the optical transfer function from entrance of light into the image taking optical system 101 to acquisition of the input image by image pickup with the image pickup element 102).

Factors that deteriorate the optical transfer function other than those in the image taking optical system 101 are as follows. For example, a low-pass filter (not shown) disposed at the front of the image pickup element 102 suppresses a high-frequency component with respect to frequency characteristics of the optical transfer function. Further, an infrared cut filter similarly disposed at the front of the image pickup element 102 affects a point spread function (PSF) of each of R, G and B channels (especially that of the R channel). Moreover, a shape or an aperture ratio of a pixel aperture of the image pickup element 102 also affects frequency characteristics. Other factors that deteriorate the optical transfer function are spectral characteristics of a light source for illuminating an object, and spectral characteristics of various wavelength filters. Thus, the image restoration filter is preferably created based on an optical transfer function in a broad sense taking the aforementioned factors into consideration.

The image taking optical system 101 may be disposed as part of the image pickup apparatus, or interchangeable for the image pickup apparatus.

When the input image is an RGB color image, it is preferable to create plural (three in this embodiment) image restoration filters for color components of R, G and B. This is because the image taking optical system 101 has chromatic aberration, and thereby blurring degrees are different from one color component to another. Therefore, in order to acquire image restoration filters optimal for the respective color components, characteristics thereof should be varied based on the chromatic aberration. In other words, it is preferable to create three image restoration filters for the three color components which have different two-dimensional distributions of the cell values shown in FIG. 5 from each other.

Although FIG. 4 shows the image restoration filter having 11×11 cells, the number of cells of the image restoration filter may be optionally set according to the aberration amount. The number of cells (cell arrangement) in longitudinal and lateral directions of the image restoration filter does not need to be in a square arrangement shown in FIG. 4. The number of cells can be arbitrarily changed as long as the cell arrangement is taken into consideration in the convolution processing.

A specific selection and creation (correction) method of the image restoration filter will be hereinafter described. In FIG. 3, it is presumed that an image pickup condition indicated by a large white circle is a real image pickup condition acquired at Step S2. When an image restoration filter stored in the memory part 108 (hereinafter referred to as "stored filter") is present at the real image pickup condition or a condition quite similar thereto, this stored filter is selected to be used for the image restoration processing. When no stored filter is present at the real image pickup condition or the condition quite similar thereto, an image restoration filter is selected or created (corrected) by the following method.

At Step S3, the image processing part 104 calculates distances between the real image pickup condition and image pickup conditions corresponding to plural stored filters in the image pickup condition space. The image processing part 104 selects the stored filter corresponding to the image pickup condition having a shortest distance among the calculated distances.

Selection of such a stored filter minimizes a difference amount (condition difference amount) between the real image pickup condition and the image pickup condition corresponding to the selected stored filter. As a result, a correction amount of the stored filter can be reduced, and an image restoration filter more similar to the image restoration filter corresponding to the real image pickup condition can be created.

In FIG. 3, it is presumed that a stored filter corresponding to an image pickup condition indicated by a small white circle is selected. FIG. 3 conceptually shows the image pickup condition space. However, data of each real stored filter needs information on a coordinate value.

Thus, the stored filter may contain coordinate value information, or data of each stored filter may be set in a multidimensional arrangement space in which addresses (coordinates) are predetermined.

Next, at Step S4, the image processing part 104 calculates condition difference amounts ΔA, ΔB and ΔC between the image pickup condition (A, B and C) corresponding to the stored filter selected at Step S3 and the real image pickup condition. At Step S5, the image processing part 104 calculates condition correction coefficients based on the condition difference amounts ΔA, ΔB and ΔC. At Step S6, the image processing part 104 corrects the stored filter selected at Step S3 using the condition correction coefficients. As a result, an image restoration filter corresponding to the real image pickup condition can be created.

On the other hand, the geometric transformation condition for the geometric transformation processing (distortion correction processing) corresponding to the actual image pickup condition can be selected or created through the selection of the image restoration filter, the calculation of the condition difference amount, the calculation of the condition correction coefficients and the correction of the selected filter. However, for the geometric transformation condition, parameters of the image pickup condition which form axes of the image pickup condition space may be different from those of the image restoration filter. For example, the distortion aberration does not depend on the aperture diameter, and therefore the image pickup condition does not need to include the aperture diameter.

Next, at Step S7, the image processing part 104 performs the image restoration processing on the input image acquired at Step S1 using the selected or created image restoration filter. Performing the convolution processing on the input image using the image restoration filter enables reduction or removal of an image blur component and a color blur component contained in the input image, which are caused by the aberration of the image taking optical system 101.

Next, at Step S8, the image processing part 104 performs, using the selected or created (corrected) geometric transformation condition, the geometric transformation processing, which is the distortion correction processing, on the resulting image obtained by the image restoration processing at Step S7. The geometric transformation processing can reduce (or removes) the distortion component of the image generated due to the aberration of the image taking optical system 101.

Moreover, at this step, the image processing part 104 separates the resulting image obtained by the image restoration processing into three color components of R, G and B. Then, the image processing part 104 performs geometric transformation (scaling) on the R and B images based on the G image so as to match the R and B images with the G image, which reduces (or removes) a color shear component that is a component of chromatic aberration of magnification. Adjusting the geometric transformation conditions for the respective color components used in the distortion correction processing enables reduction (or removal) of the color shear component with the distortion component by the distortion correction processing.

The processing performed at Steps S3 to S8 may be performed by an apparatus (personal computer or the like) different from the image pickup apparatus. In such a case, processing for storing (installing) an image restoration filter acquired by the different apparatus into the memory part 108 of the image pickup apparatus may be performed.

In FIG. 1, an output image obtained by the image restoration processing and the distortion correction processing by the image processing part 104 is stored in a predetermined format in an image recording medium 109 such as a semiconductor memory or an optical disk. The output image is a high quality image sharpened and whose distortion component has been reduced by the image restoration processing.

The output image is displayed by a display part 105 or output to the outside (printer or database) of the image pickup apparatus.

The above-described operations including the photoelectric conversion at the image pickup element 102, the image processing at the image processing part 104, the recording in the image recording medium 109 and the image displaying at the display part 105 are controlled by the system controller 110. Zoom driving and focus driving of the image taking optical system 101 are controlled by the image taking optical system control part 106 based on instructions from the system controller 110.

Figure 6:
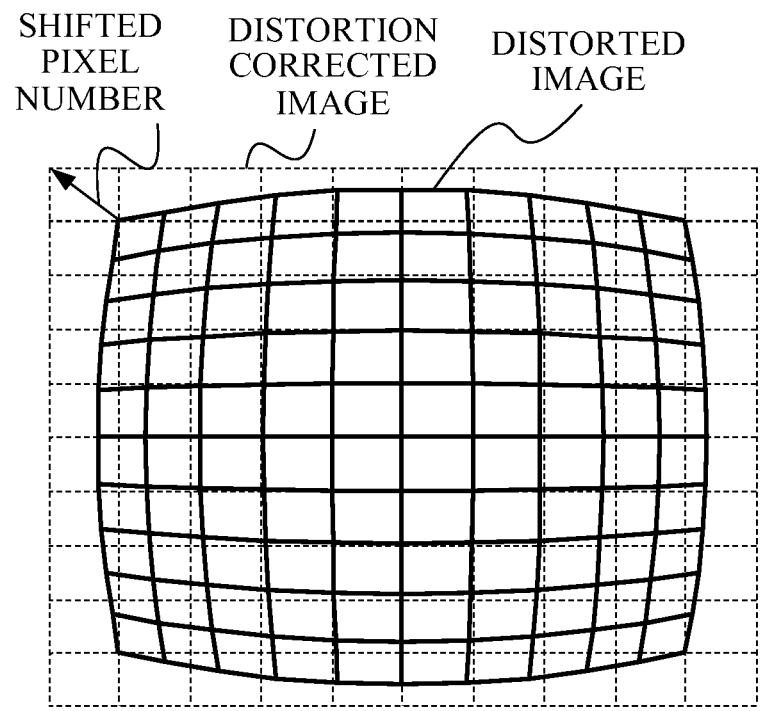
FIG. 6 is an explanatory diagram of distortion correction processing in Embodiment 1.

It is preferable that the image taking optical system 101 be designed such that a lateral magnification of the image taking optical system 101 for a central image height is larger 1.25 times or more than that for a maximum image height. Thereby, a diameter of a front lens of the image taking optical system 101 located nearest to the object can be reduced, or field curvature can be corrected. This embodiment generates, as shown in FIG. 6, a distortion of −20% at the maximum image height.

As described above, in this embodiment, the image processing part 104 detects the image pickup condition of the image pickup apparatus and then performs the image restoration processing and the distortion correction processing corresponding to the image pickup condition to generate a high quality output image. The image restoration filter and the geometric transformation condition used in the image restoration processing and the distortion correction processing can be selected from ones stored in the memory part 108 in advance or can be obtained by correcting the stored image restoration filter and geometric transformation condition such that they correspond to the actual image pickup condition. Therefore, the image restoration filter and the geometric transformation condition can be determined continuously with respect to the image pickup conditions.

Further, the image processing part 104 performs the distortion correction processing on the image on which the image restoration processing has been performed, which can obtain an image whose image blur component and distortion component has been well corrected. Moreover, performing the distortion correction processing after the image restoration processing can prevent increase of a data volume of the image restoration filter and deterioration of the image due to the geometric transformation, and makes it possible to apply the image restoration filter to a peripheral part of the image to obtain a good output image. Detailed description will hereinafter be made of these effects.

The image restoration filter, as described above, is created on the basis of the optical transfer function (OTF) from the entrance of light into the image taking optical system 101 to the acquisition of the input image by image pickup with the image pickup element 102. This optical transfer function (OTF) is obtained by calculation based on ray tracing for designed lens data or measurement of image-forming light obtained by causing light to enter an actual image taking optical system. When the optical transfer function is obtained by the measurement, it can be obtained by Fourier transformation of a point spread function (PSF) or a line spread function (LSF) which are directly measured. The optical transfer function (OTF) obtained by each method includes influences of compression and expansion of a peripheral part of an image plane due to the distortion of the image taking optical system.

When the distortion is negative, the distortion has a barrel shape, and therefore a formed image is spatially compressed in its peripheral part as a position approaches an edge thereof. Moreover, when the distortion is positive, the distortion has a bobbin shape, and therefore a formed image is spatially expanded as a position approaches the edge. Thus, the image restoration filter created on the basis of the optical transfer function (OTF) also contains the influence of the distortion.

As described above, each cell of the image restoration filter corresponds to one pixel of the input image that is the correction target. Performing the convolution processing with the image restoration filter on the input image provides a restored image (that is, reduces the image blur component). Performing the convolution processing with the image restoration filter on the image on which the distortion correction processing has not yet been performed causes each cell of the image restoration filter to properly correspond to each pixel of the image, which enables acquisition of a good restored image.

In contrast thereto, when performing the convolution processing with the image restoration filter on the image on which the distortion correction processing has already been performed, the geometric transformation has already been performed on the image, so that each cell of the image restoration filter does not correspond to each pixel of the image at all, and therefore a good restored image cannot be obtained. Such a problem is conspicuous when an amount of the distortion is large, that is, when an amount of the geometric transformation in the distortion correction processing is large.

Table 1 shows a number of shifting pixels for a negative distortion amount in a peripheral part of an image shown in FIG. 6 whose aspect ratio is 4:3 and whose number of pixels is 10 million. In FIG. 6, a distorted lattice illustrated by solid lines shows a shape of an image (distorted image) before the distortion correction processing, a lattice illustrated by dashed lines mutually orthogonal shows a shape of an image after the distortion correction processing (distortion corrected image). The number of shifting pixels in Table 1 shows a number of shifting pixels in a diagonal direction (specific direction) in FIG. 6.

As understood from Table 1, even when the distortion amount is −5%, the number of shifting pixels in the geometric transformation exceeds 100. Therefore, it is essentially impossible to cause each cell of the image restoration filter to correspond to each pixel of an image acquired by image pickup through an image taking optical system having distortion.

TABLE 1

| DISTORTION [%] | NUMBER OF SHIFTING PIXELS |
|---|---|
| −5 | 114 |
| −10 | 228 |
| −15 | 342 |
| −20 | 456 |
| −25 | 571 |

When the image restoration processing is performed on an image on which the distortion correction processing has been performed, as a method for causing each cell of the image restoration filter to correspond to each pixel of the image, there is a method using an image restoration filter on which the geometric transformation has been performed according to the geometric transformation condition of the distortion correction processing.

Figure 7:
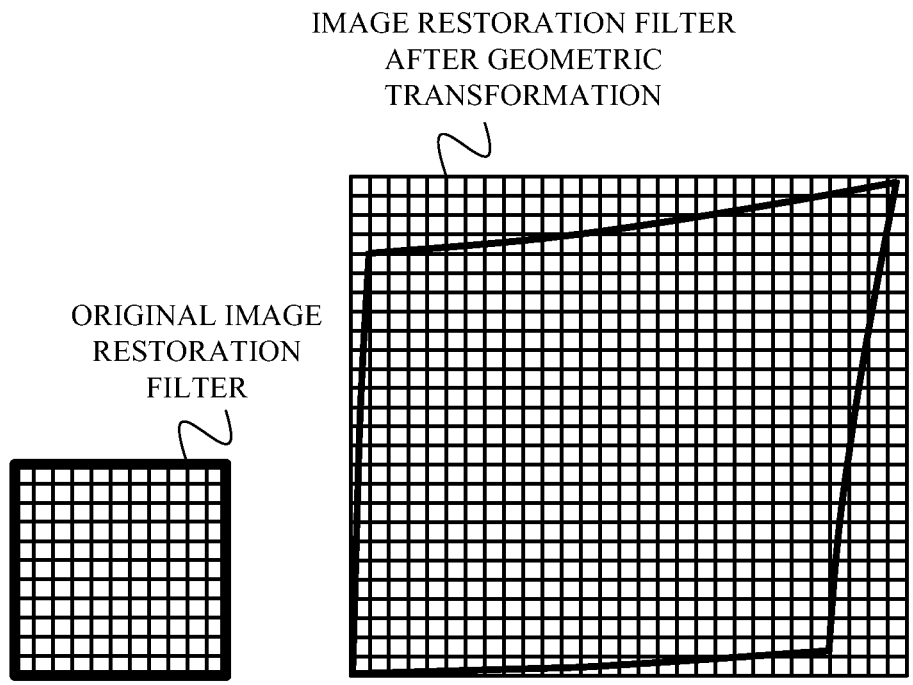
FIG. 7 is an explanatory diagram of the image restoration filter for explaining effects of Embodiment 1.

At the left of FIG. 7, an original image restoration filter before the geometric transformation is schematically shown, and at the right thereof an image restoration filter after the geometric transformation is schematically shown. The original image restoration filter has 11×11 cells. Each cell has a value (not shown).

The image restoration filter after the geometric transformation shown in FIG. 7 has been corrected on the basis of the geometric transformation condition in a peripheral part of an image having a distortion amount of −20%. In the condition where the distortion amount is −20%, it is necessary to enlarge the image restoration filter approximately twice in vertical and horizontal directions and to perform pixel (cell) interpolation. Further, transformation conversion of the image restoration filter should be simultaneously performed.

A heavy line shown at the right of FIG. 7 shows an outline of the image restoration filter after the geometric transformation of the original image restoration filter. The image restoration filter after the geometric transformation is redivided with a cell lattice, and the redivided image restoration filter is used as the image restoration filter in the actual image restoration processing.

As clear from FIG. 7, this method increases the number of cells of the image restoration filter according to the distortion amount. Therefore, in order to store the image restoration filter in the memory part 108 of the image pickup apparatus, it is necessary to significantly increase capacity of the memory part 108. In addition, the increase of the number of cells of the image restoration filter increases a calculation volume in the convolution processing. Thus, a processing speed is significantly lowered. Moreover, resampling by the transformation conversion of the image restoration filter is required, which may decrease accuracy.

Figure 8:
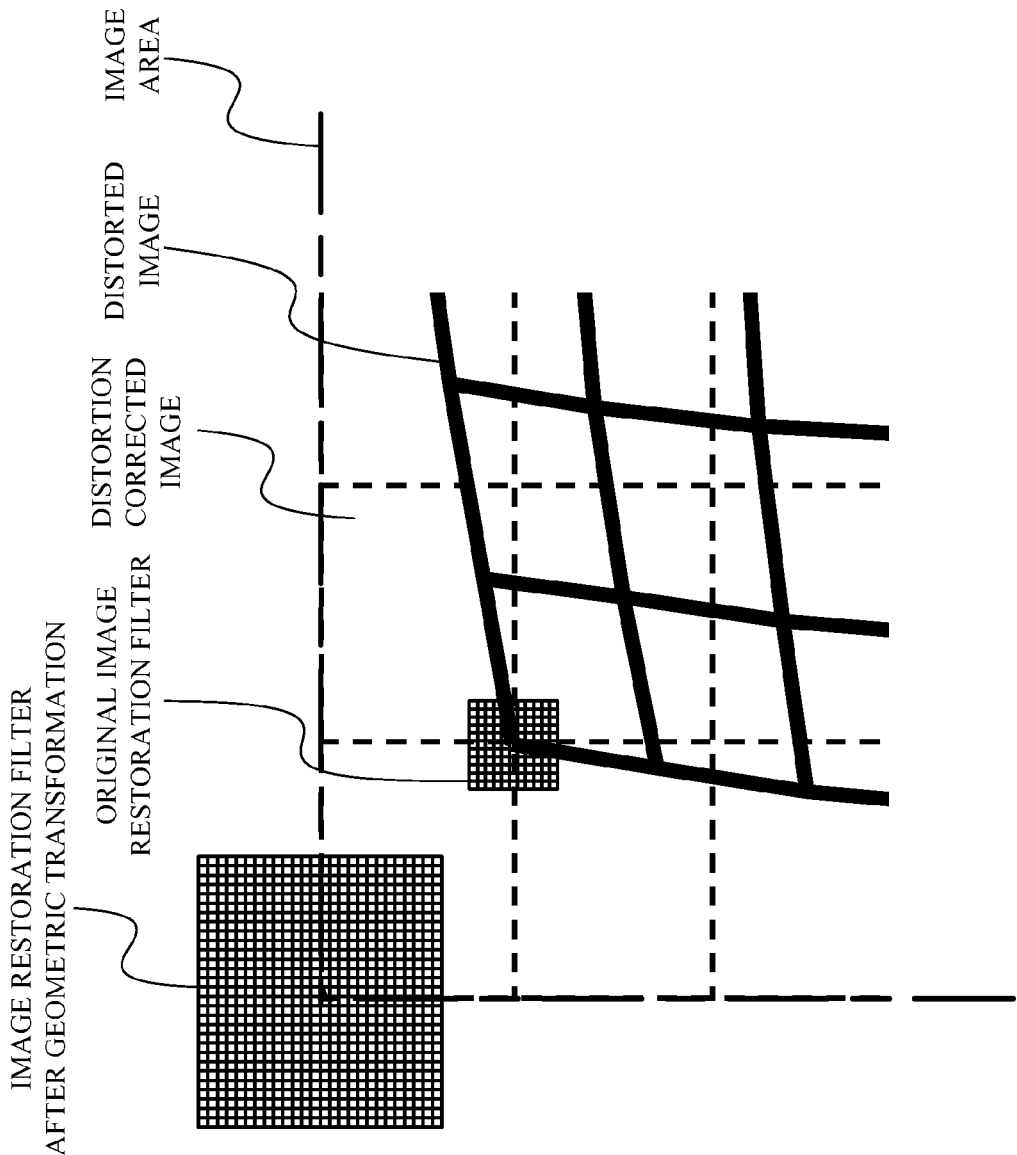
FIG. 8 is an explanatory diagram of an unrestorable area for explaining effects of Embodiment 1.

Another problem will be described with FIG. 8. When the convolution processing with the image restoration filter is performed on the image before the distortion correction processing, the convolution processing with the image restoration filter should be performed only in an area including a distorted image shown by a heavy line in the figure. When the convolution processing with the image restoration filter is performed near a periphery of the image, data for a more outer area than the periphery is required according to the number of cells of the filter. The more outer area than the periphery (heavy line) is an unnecessary area which does not remain as part of the image finally by the distortion correction processing which is performed later. However, the unnecessary area is an area existing as part of the image before the distortion correction processing, so that the image restoration processing to the peripheral part of the image can be performed using the unnecessary area.

On the other hand, in the convolution processing on the image on which the distortion correction processing has been performed, the image restoration filter has enlarged as described above, and an unrestorable area where data referred by the image restoration filter does not exist is generated near the peripheral part of the image. For example, in the case shown in FIG. 8, the image restoration filter after the geometric transformation can refer only a second quadrant. Even if the processing is performed on the assumption that the area where the data referred by the image restoration filter does not exist has a value of 0 for example, a good restored image cannot be obtained. Therefore, a final image is, in effect, an image whose peripheral part is cut.

In this embodiment, the image restoration processing is performed by using image information of an image area (peripheral part) which is removed by the distortion correction processing after the image restoration processing. Therefore, sufficient image information can be used in the convolution processing with the image restoration filter.

It is preferable that the image restoration filter and the geometric transformation condition satisfy the following relationship (condition):

$$0 < F/D < 2$$

where D represents a number of pixels by which an edge pixel of an effective image area in the image on which the image restoration processing has been performed is shifted in a specific direction by the geometric transformation processing (distortion correction processing), and F represents a number of cells in the specific direction in the image restoration filter applied to the edge pixel.

The satisfaction of the relationship enables convolution processing with the image restoration filter without impairing the effective image area that should be left after the distortion correction.

If the value of F/D exceeds the upper limit of the above relational expression, an area where the convolution processing cannot be performed may be generated in the effective image area in the image restoration processing. On the other hand, if the value of F/D falls below the lower limit of the above relational expression, it becomes necessary to reduce the number of cells of the image restoration filter, which may make it impossible to perform sufficient image restoration processing.

In this embodiment, at an edge of the image in its diagonal direction (specific direction), the number of cells of the image restoration filter in its vertical direction is 11 (=F) and the distortion amount is −20%. In this case, the number of shifting pixels in the diagonal direction is 274 (=D). Therefore, F/D is 0.04. Moreover, at an edge of the image in the vertical direction (specific direction) at a center in a horizontal direction of the image, the number of cells of the image restoration filter in its vertical direction is 11 (=F) and the distortion amount is −20%. In this case, the number of shifting pixels in the vertical direction is 112 (=D). Therefore, F/D is 0.1.

It is more preferable that the lower limit of the above relational expression be 0.02.

The image restoration processing and the distortion correction processing may be selectively performed according to the zoom position of the image taking optical system 101. For example, when there is little distortion at a telephoto end, only the image restoration processing should be performed, which can make the processing speed fast.

The above-described optical transfer function (OTF) is changed according to an angle of view (image height) even in the same image pickup condition. Therefore, it is desirable that the image restoration processing be performed by changing the image restoration filter for each of plural areas divided according to the image height in the input image. In this case, the convolution processing may be performed with scanning of the image restoration filter on the input image, and the image restoration filters may be sequentially changed for the respective divided areas.

Moreover, correcting the image restoration filter according to a signal value of a pixel in the input image, which is a target of the image restoration processing, enables suppression of increase of noise which becomes conspicuous in a dark area of the input image. A noise component for an image signal in the dark area of the input image is relatively large as compared with that in a bright area, and thus the image restoration processing may emphasize the noise. Therefore, in the dark area, correcting the respective cell values of the image restoration filter so as to reduce its image restoration effect can suppress the increase of the noise. No image restoration processing may be performed for a pixel or a pixel area whose signal value is equal to or less than a threshold value.

Moreover, when there is a correction error in the restored image after the image restoration processing, another image processing may be performed to correct the correction error. The other image processing can further reduce a residual aberration component in the restored image caused by a difference between the real image pickup condition and the image pickup condition corresponding to the image restoration filter used for the image restoration processing.

Furthermore, when there is a brightness saturation area in the input image, an aberration component becomes conspicuous in a peripheral part of the input image. However, in the image restoration processing, an original brightness value may be unknown for a pixel whose brightness value is saturated, disabling good correction. In such a case, detecting a residual aberration component from the restored image after the image restoration processing to perform adaptive correction processing enables achievement of higher image quality. The adaptive correction processing corrects aberration lastly left in the image having the image blur component and the distortion component reduced by the image restoration processing of this embodiment, so that the adaptive correction processing is preferably performed after the distortion correction processing.

As described above, in this embodiment, the image which has been corrected by the image restoration processing is corrected by the distortion correction processing. Therefore, this embodiment can provide a good output image without increase of the number of cells of the image restoration filter, deterioration of accuracy of the image restoration and generation of the unrestorable area in the peripheral part of the image.

The above embodiment has been described the image pickup apparatus using the image processing method (that is, equipped with the image processing apparatus). However, the image processing method can be implemented by an image processing program installed in a personal computer. In this case, the personal computer corresponds to the image processing apparatus of the present invention. The personal computer takes in (acquires) an image (input image) generated by the image pickup apparatus and yet to be subjected to the image restoration processing, and performs the image restoration processing according to the image processing program to output a resulting image.

[Embodiment 2]

Description will be next made of a second embodiment (Embodiment 2) of the present invention. An image processing method of this embodiment is also performed in an image pickup apparatus basically identical to the image pickup apparatus shown in FIG. 1 in Embodiment 1. Therefore, components common to or having similar functions to those in Embodiment 1 are denoted by the same reference numerals as those in Embodiment 1. The image processing described in this embodiment may be performed by a personal computer (image processing apparatus).

This embodiment reduces (corrects) by the image restoration processing not only the image blur component and the color blur component of the input image, but also a color shear component which is a component of chromatic aberration of magnification. Thus, this embodiment uses an image restoration filter capable of correcting the image blur component, the color blur component and the color shear component in the image restoration processing. This embodiment reduces (corrects) the distortion component by the distortion correction processing.

This embodiment selects the image restoration filters for the respective color components of R, G and B according to the image pickup condition, or creates them by correcting the selected image restoration filters.

Figure 9:
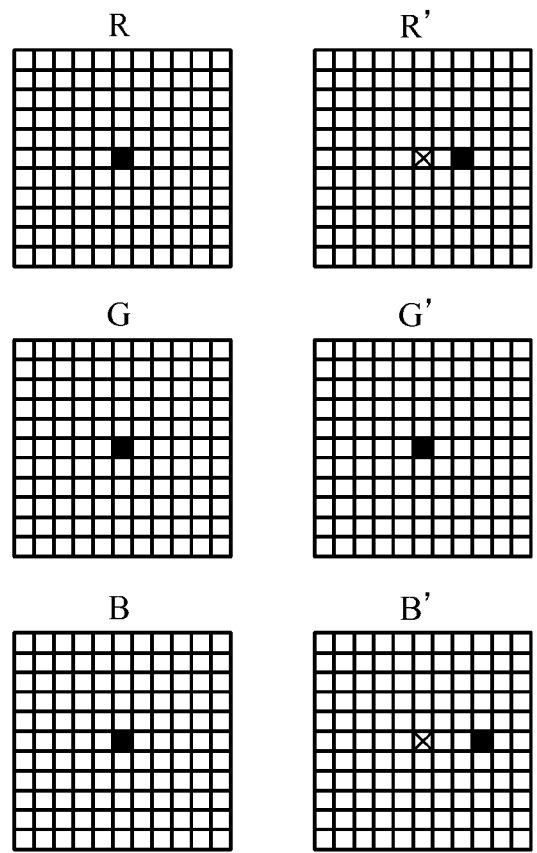
FIG. 9 shows image restoration filters for respective colors used in Embodiment 2 of the present invention.

FIG. 9 shows examples of the image restoration filters for the respective color components. The image restoration filters shown by R, G and B are filters for R, G and B colors, respectively. These image restoration filters are filters for correcting the image blur component and the color blur component as described in Embodiment 1, but have no correction function for the color shear component corresponding to the chromatic aberration of magnification.

The image restoration filters shown by R', G' and B' in FIG. 12 are also filters for the R, G and B colors, respectively. Each of these image restoration filters has the correction function for the color shear component in addition to the correction function for the image blur component and the color blur component. Specifically, in at least one (R' and B') of the three image restoration filters, a position of a cell having a maximum absolute value among cell values (filter values), that is, a maximum-value cell is shifted from that of a center cell of the image restoration filter.

In each image restoration filter, a blackened cell is the maximum-value cell, and a cell indicated by x is the center cell.

The image restoration filters shown by R, G and B in FIG. 12 are different from each other in filter characteristics due to differences in optical transfer function (OTF) for the respective color components. However, the positions of the maximum-value cells of the image restoration filters are the same (identical to the positions of the center cells).

Figure 10:
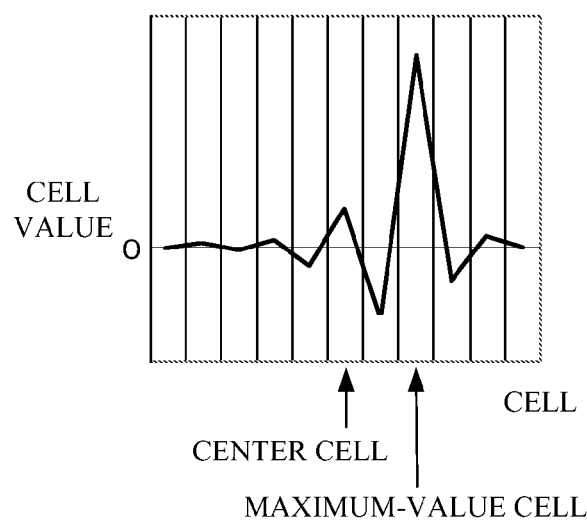
FIG. 10 shows a distribution of cell values of each image restoration filter in Embodiment 2.

The image restoration filters shown by R', G' and B' are different from each other in shift amount of the position of the maximum-value cell with respect to that of the center cell in addition to the difference in filter characteristics. Relative shift amounts of the positions of the maximum-value cells among the image restoration filters (R', G' and B') correspond to an amount of the chromatic aberration of magnification of the image taking optical system 101. FIG. 10 shows the cell values (filter values) in one section of the image restoration filter shown by R' in FIG. 12.

Making the cell value distributions of the image restoration filters shown by R', G' and B' for the respective color components different from each other enables correction of the image blur component and the color blur component in the respective colors. Further, making positions of the cell value distributions of the image restoration filters shown by R', G' and B' different from each other (that is, making the shift amounts between the position of the maximum-value cell and that of the center cell in the image restoration filters different from each other [however, the shift amount in G' is 0 in this embodiment]) enables correction of the color shear component.

If the cell value distribution of the image restoration filter protrudes from the original cell area when the cell value distribution is moved, it is preferable to increase the number of cells of the image restoration filter.

Figure 11:
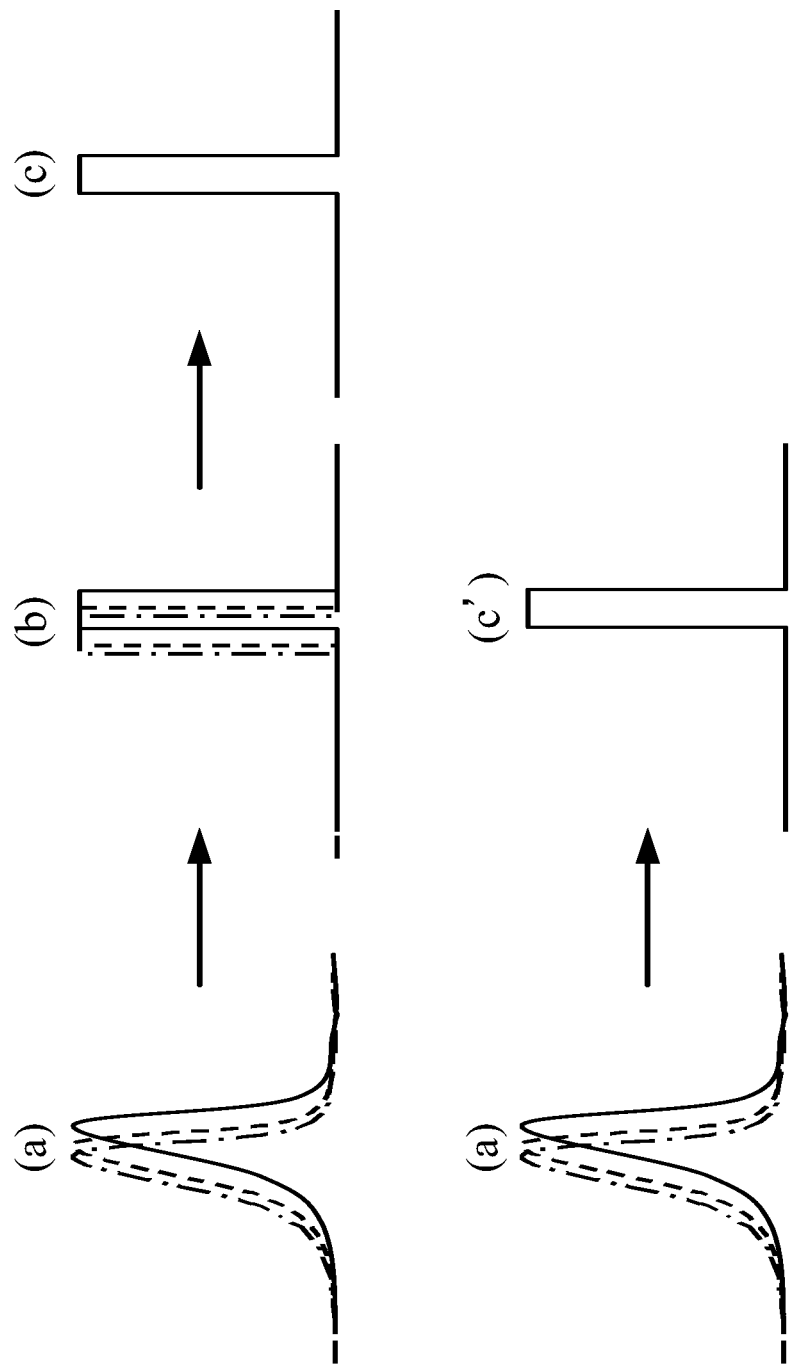
FIG. 11 is an explanatory diagram of effects obtained by image restoration processing in Embodiment 2.

Next, referring to FIG. 11, an effect obtained by the image restoration processing using the image restoration filters shown by R', G' and B' in FIG. 12 will be described. In FIG. 11, (a) shows an input image in which object images of R, G and B normally having a rectangular profile if there is no influence of the aberration of the image taking optical system 101 deteriorate into blur images due to the aberration of the image taking optical system 101.

A solid line, a broken line and a chain line respectively indicate a G component, an R component, and a B component. In (a), the G component, the R component and B component are different from each other in blur spreading, and in peak position. Deterioration of a profile of each color component corresponds to the image blur component, coloring caused by differences in blur amount among the color components corresponds to the color blur component, and shifting of the peak positions corresponds to the color shear component.

In FIG. 11, (b) shows a restored image in the case where the image restoration processing is performed on the input image shown in (a) by using the image restoration filters shown by R, G and B in FIG. 9. In the restored image, the color shear component is yet to be corrected while the blur component (including the color blur component) has been corrected such that object images of R, G and B have their original rectangular profile. Performing scaling of the respective color images or distortion correction processing as described in Embodiment 1 can correct color shearing to obtain an image shown in (c).

On the other hand, the image restoration processing on the input image shown in (a) using the image restoration filters shown by R', G' and B' simultaneously corrects, as shown in (c'), the blur component (including the color blur component) in each color component and the color shear component.

As described above, this embodiment can perform correction processing for the blur component (that is, the image restoration processing) and correction processing for the color shear component, which have been separately performed in conventional image processing, in one (single) image restoration processing. Therefore, the blur component and the color shear component (magnification chromatic aberration component) can be reduced by high-speed image restoration processing, and then the distortion component can be corrected by the distortion correction processing, which can provide a good output image.

It is desirable that, especially when performing image processing on an image generated by image pickup, the blur component and color shear component other than the distortion component be first reduced (corrected), and finally the distortion component be corrected.

Each of the above embodiments has been described the case where the input image is an RGB color image. However, the present invention can be applied to other color images such as a YCC color image.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures and functions.

As described above, each of the embodiments performs the image restoration processing for reducing the blur component on the image before the distortion component is reduced by the geometric transformation processing, thereby suppressing increase of the number of cells of the image restoration filter. In other words, each of the embodiments can decrease the number of cells of the image restoration filter to a small number corresponding to the blur component. Moreover, when performing the geometric transformation processing on the image after the image restoration processing, due to the property of the distortion, the distortion component can be corrected without influences of the image restoration processing on the geometric transformation condition. Accordingly, each of the embodiments can correct the blur component and the distortion component well while preventing lowering of the processing speed due to increase of the data volume of the image restoration filter.

This application claims the benefit of Japanese Patent Application No. 2008-252325, filed on Sep. 30, 2008, which is hereby incorporated by reference herein in its entirety.

INDUSTRIAL APPLICABILITY

The present invention can provide an image processing method, an image processing apparatus and an image pickup apparatus capable of correcting a blur component and a distortion component contained in an image generated by image pickup to output a high quality image.

The invention claimed is:

1. An image processing method for processing an image generated by image pickup using an optical system, the method comprising:
    a step of acquiring the image;
    an image restoration step of performing image restoration processing to reduce a blur component of the image using an image restoration filter created on a basis of an optical transfer function of the optical system; and
    a distortion correction step of performing geometric transformation processing to reduce a distortion component of the image on which the image restoration processing has been performed, only after performing the image restoration step,
    wherein no other geometric transformation processing to reduce a distortion component of the image is performed before the image restoration step,
    wherein the image restoration step performs the image restoration processing using image information of an area to be removed by the geometric transformation processing in the image, and wherein the following relationship is satisfied:

0<F/D<2, where D represents a number of pixels by which an edge pixel of an effective image area in the image on which the image restoration processing has been performed is shifted in a specific direction by the geometric transformation processing, and F represents a number of cells in the specific direction in the image restoration filter applied to the edge pixel.

2. An image processing method according to claim 1, wherein the image restoration filter is created by performing inverse Fourier transformation on a function created on a basis of an inverse function of an optical transfer function of the optical system.

3. An image processing method according to claim 1, wherein:
the image restoration step acquires information on an image pickup condition, and
the image restoration step performs the image restoration processing using the image restoration filter selected or created based on the information on the image pickup condition.

4. An image processing method according to claim 1, wherein:
the distortion correction step acquires information on an image pickup condition, and
the distortion correction step performs the geometric transformation processing using a geometric transformation condition selected or created based on the information on the image pickup condition.

5. An image processing method according to claim 1, wherein:
the image restoration step uses plural image restoration filters for plural colors as the image restoration filter, the plural image restoration filters having mutually different two-dimensional distributions of the filter values, and
the plural image restoration filters have mutually different shift amounts of a position of a cell having a maximum absolute value of the filter value with respect to a position of a center cell, the shift amounts corresponding to an amount of chromatic aberration of magnification of the optical system, and the plural image restoration filters reduce the blur component and a component of chromatic aberration of magnification.

6. An image processing method according to claim 1, wherein the image restoration step performs convolution processing using the image restoration filter on the image.

7. An image processing apparatus processing an image generated by image pickup using an optical system, the image processing apparatus comprising:
an image restoring part configured to perform image restoration processing to reduce a blur component of the image using an image restoration filter created on a basis of an optical transfer function of the optical system; and
a distortion correcting part configured to perform geometric transformation processing to reduce a distortion component of the image on which the image restoration processing has been performed, only after the image restoration processing has been performed,
wherein no other geometric transformation processing to reduce a distortion component of the image is performed before the image restoration processing has been performed,
wherein the image restoring part performs the image restoration processing using image information of an area to be removed by the geometric transformation processing in the image, and
wherein the following relationship is satisfied:

0<F/D<2, where D represents a number of pixels by which an edge pixel of an effective image area in the image on which the image restoration processing has been performed is shifted in a specific direction by the geometric transformation processing, and F represents a number of cells in the specific direction in the image restoration filter applied to the edge pixel.

8. An image pickup apparatus comprising:
an image pickup system configured to photoelectrically convert an object image formed by an optical system to generate an image; and
an image processing apparatus processing an image generated by image pickup using an optical system,
wherein the image processing apparatus comprises:
an image restoring part configured to perform image restoration processing to reduce a blur component of the image using an image restoration filter created on a basis of an optical transfer function of the optical system; and
a distortion correcting part configured to perform geometric transformation processing to reduce a distortion component of the image on which the image restoration processing has been performed, only after the image restoration processing has been performed,
wherein no other geometric transformation processing to reduce a distortion component of the image is performed before the image restoration processing has been performed,
wherein the image restoring part performs the image restoration processing using image information of an area to be removed by the geometric transformation processing in the image, and
wherein the following relationship is satisfied:

0<F/D<2, where D represents a number of pixels by which an edge pixel of an effective image area in the image on which the image restoration processing has been performed is shifted in a specific direction by the geometric transformation processing, and F represents a number of cells in the specific direction in the image restoration filter applied to the edge pixel.

* * * * *